United States Patent
Koseoglu et al.

(10) Patent No.: US 10,357,761 B2
(45) Date of Patent: *Jul. 23, 2019

(54) CATALYST FOR FLUIDIZED CATALYTIC CRACKING AND METHOD FOR FLUIDIZED CATALYTIC CRACKING

(71) Applicants: Saudi Arabian Oil Company, Dhahran (SA); Japan Cooperation Center, Petroleum, Tokyo (JP); JGC Catalysts and Chemicals Ltd., Kanagawa (JP)

(72) Inventors: Omer Refa Koseoglu, Dhahran (SA); Bandar Hussain Alsolami, Dhahran (SA); Masaru Ushio, Yokohama (JP); Seiji Arakawa, Kawasaki (JP)

(73) Assignees: Saudi Arabian Oil Company, Dhahran (SA); JGC Catalysts and Chemicals Ltd., Kanagawa (JP); Japan Cooperation Center PEtroleum, Tokyo (JP)

(*) Notice: Subject to any disclaimer, the term of this patent is extended or adjusted under 35 U.S.C. 154(b) by 29 days.

This patent is subject to a terminal disclaimer.

(21) Appl. No.: 14/719,582

(22) Filed: May 22, 2015

(65) Prior Publication Data

US 2015/0375218 A1  Dec. 31, 2015

Related U.S. Application Data

(60) Provisional application No. 62/001,971, filed on May 22, 2014.

(51) Int. Cl.
*C10G 11/18* (2006.01)
*B01J 29/89* (2006.01)
(Continued)

(52) U.S. Cl.
CPC ............... *B01J 29/89* (2013.01); *B01J 21/12* (2013.01); *B01J 21/16* (2013.01); *B01J 35/1023* (2013.01);
(Continued)

(58) Field of Classification Search
CPC ........................................... C10G 11/18
See application file for complete search history.

(56) References Cited

U.S. PATENT DOCUMENTS 4,210,560 A * 7/1980 Kehl ..................... B01J 27/16
502/208
4,255,288 A   3/1981 Cull et al.
(Continued)

FOREIGN PATENT DOCUMENTS

CN   101134576 A    3/2008
CN   101898144   * 12/2010
(Continued)

OTHER PUBLICATIONS

Bradley et al; Characterization and Catalyst Development ACS Symposium Series; American Chemical Society; Washington, DC, 1989. (Year: 1989).*

(Continued)

*Primary Examiner* — Michelle Stein
(74) *Attorney, Agent, or Firm* — Abelman, Frayne & Schwab

(57) ABSTRACT

The present invention relates to a catalyst for fluidized catalytic cracking of hydrocarbon oil containing a framework-substituted zeolite-1 in which zirconium atoms and/or hafnium atoms form a part of a framework of an ultra-stable Y-type zeolite.

17 Claims, 2 Drawing Sheets

(51) Int. Cl.

| | | |
|---|---|---|
| *C10G 11/05* | (2006.01) | |
| *B01J 21/12* | (2006.01) | |
| *B01J 21/16* | (2006.01) | |
| *B01J 35/10* | (2006.01) | |
| *C01B 39/24* | (2006.01) | |
| *C10L 1/06* | (2006.01) | |
| *C01B 39/06* | (2006.01) | |
| *B01J 29/00* | (2006.01) | |

(52) U.S. Cl.
CPC ............ *C01B 39/065* (2013.01); *C01B 39/24* (2013.01); *C10G 11/05* (2013.01); *C10G 11/18* (2013.01); *C10L 1/06* (2013.01); *B01J 29/005* (2013.01); *B01J 2229/183* (2013.01); *B01J 2229/186* (2013.01); *B01J 2229/20* (2013.01); *B01J 2229/36* (2013.01); *B01J 2229/37* (2013.01); *B01J 2229/42* (2013.01); *C10G 2400/20* (2013.01); *C10L 2270/023* (2013.01)

(56) References Cited

U.S. PATENT DOCUMENTS

| | | | |
|---|---|---|---|
| 4,826,586 A * | 5/1989 | Herbst | C10G 11/05 208/120.01 |
| 4,855,036 A | 8/1989 | Chiang et al. | |
| 5,308,813 A | 5/1994 | Vaughan et al. | |
| 5,411,724 A | 5/1995 | Beyer et al. | |
| 6,132,594 A | 10/2000 | Okazaki et al. | |
| 6,346,224 B1 | 2/2002 | Vitale-Rojas et al. | |
| 6,358,486 B1 | 3/2002 | Shan et al. | |
| 6,482,313 B1 * | 11/2002 | Schuette | B01J 29/08 208/113 |
| 6,726,834 B2 | 4/2004 | Quesada et al. | |
| 6,762,143 B2 | 7/2004 | Shan et al. | |
| 7,084,087 B2 | 8/2006 | Shan et al. | |
| 7,550,405 B2 | 6/2009 | Shan et al. | |
| 8,002,970 B2 | 8/2011 | Euzen et al. | |
| 9,221,036 B2 | 12/2015 | Koseoglu et al. | |
| 10,081,009 B2 * | 9/2018 | Koseoglu | B01J 23/755 |
| 2003/0006168 A1 * | 1/2003 | Ino | C10G 11/05 208/120.01 |
| 2009/0283443 A1 | 11/2009 | Kuroda et al. | |
| 2011/0251049 A1 * | 10/2011 | Kuroda | B01J 29/89 502/79 |
| 2013/0175202 A1 | 7/2013 | Koseoglu et al. | |
| 2015/0111721 A1 | 4/2015 | Tian et al. | |
| 2015/0111722 A1 | 4/2015 | Long et al. | |

FOREIGN PATENT DOCUMENTS

| | | |
|---|---|---|
| CN | 101898144 A | 12/2010 |
| JP | H07-308581 | 11/1995 |
| WO | 2013057319 A2 | 4/2013 |
| WO | 2013123299 A1 | 8/2013 |

OTHER PUBLICATIONS

PCT/US2015/032129, International Search Report and Written Opinion dated Aug. 21, 2015, 16 pages.

"Standard Method for Testing Fluid Cracking Catalysts by Microactivity Test Ed—American Society for Testing and Materials", 1978, Gaseous Fuels; Coal and Coke, Philadelphia, ASTM, US, pp. 661-668.

Wang et al., "Characterization of titanium-modified USY zeolites and their catalytic performance on n-heptane cracking", APPL CATAL A-GEN, vol. 214, No. 2, Jun. 29, 2001, pp. 167-177.

* cited by examiner

CATALYST FOR FLUIDIZED CATALYTIC CRACKING AND METHOD FOR FLUIDIZED CATALYTIC CRACKING

RELATED APPLICATIONS

The present application claims the benefit of U.S. Provisional Patent Application No. 62/001,971 filed on 22 May 2014, the disclosure of which is incorporated herein by reference in its entirety.

BACKGROUND OF THE INVENTION

Field of the Invention

The present invention relates particularly to a catalyst for fluidized catalytic cracking of hydrocarbon oil, the catalyst being capable of facilitating gasoline and light olefins production from heavy hydrocarbons, such as vacuum gas oil (hereinafter, also referred to as "VGO") and the like.

Description of Related Art

In fluidized catalytic cracking (FCC) processes, petroleum derived hydrocarbons are catalytically cracked with an acidic catalyst maintained in a fluidized state, which is regenerated on a continuous basis. The main product from such processes has generally been gasoline. Other products are also produced in smaller quantities via FCC processes such as liquid petroleum gas and cracked gas oil. Coke deposited on the catalyst is burned off at high temperatures and in the presence of air prior to recycling regenerated catalyst back to the reaction zone.

Despite the many advances in FCC processes, the industry is constantly seeking improved catalyst materials, particularly those capable of reducing the production of dry gas and coke.

SUMMARY OF THE INVENTION

The fluidized catalytic cracking catalyst including as a support, the zeolite in which a part of aluminum atoms constituting the zeolite framework is replaced with zirconium atoms and/or hafnium atoms, and has high cracking activity effective for production of light olefins and gasoline with low production of dry gas and coke.

In certain embodiments the catalyst for fluidized catalytic cracking of hydrocarbon oil includes an ultra-stable Y-type zeolite, wherein the ultra-stable Y-type zeolite is a framework-substituted zeolite in which a part of aluminum atoms constituting a zeolite framework thereof is substituted with zirconium atoms and/or hafnium atoms. In certain embodiments, the framework-substituted ultra-stable Y-type zeolite of the above catalyst contains from 0.1 to 5 mass % zirconium atoms and/or hafnium atoms as calculated as the oxide basis.

The framework-substituted ultra-stable Y-type zeolite above catalysts can further contain titanium atoms. In these embodiments the framework-substituted ultra-stable Y-type zeolite can contain from 0.1 to 5 mass % titanium atoms as calculated as the oxide basis.

The framework-substituted ultra-stable Y-type zeolite above catalysts can further be characterized in that a part of the aluminum atoms forming the zeolite framework is further substituted with titanium atoms. In these embodiments the framework-substituted ultra-stable Y-type zeolite can contain from 0.1 to 5 mass % titanium atoms as calculated as the oxide basis.

In certain embodiments the catalyst for fluidized catalytic cracking of hydrocarbon oil includes an ultra-stable Y-type zeolite, wherein the ultra-stable Y-type zeolite is a framework-substituted zeolite in which a part of aluminum atoms constituting a framework of the ultra-stable Y-type zeolite is substituted with titanium atoms, in certain embodiments only titanium atoms. In these embodiments the framework-substituted ultra-stable Y-type zeolite contains from 0.1 to 5 mass % titanium atoms as calculated as the oxide basis.

The catalysts of the above embodiments can be used alone or in effective combination with one or more additional fluidized cracking catalyst materials to provide a catalyst mixture.

In the catalysts of the above embodiments, the framework-substituted ultra-stable Y-type zeolite can be characterized by a crystal lattice constant of 2.430 to 2.450 nm, a specific surface area of about 600 to about 900 m$^2$/g, and a molar ratio of $SiO_2$ to $Al_2O_3$ generally in the range of about 5:1 to about 100:1, in certain embodiments about 20:1 to about 100:1, and in additional embodiments about 25:1 to about 80:1.

A method for cracking a hydrocarbon oil is also provided using a catalysts of the above embodiments in a fluidized catalytic cracking unit to produce light olefins and gasoline fuel. In certain embodiments of the method a hydrocarbon oil mixture is provided having a boiling point range above about 350° C. and the reactor is operated at reaction temperature range of about 450° C. to about 700° C., a pressure of about 1 to about 10 bars, a residence or contact time of about 0.1 to about 60 seconds, and a catalyst to oil ratio of about 2:1 to about 30:1. The fluidized catalytic cracking can be operated under conditions effective to maximize production of gasoline and light olefins, and/or under conditions effective to maximize production of light olefins.

As used herein, "heavy hydrocarbons" refer to petroleum fractions having a nominal boiling point above about 350° C., including common refinery streams such as vacuum gas oil (VGO), hydrocracking unit unconverted bottoms or recycle oil, deasphalted oil (DAO) obtained from a solvent deasphalting process, demetallized oil, light or heavy coker gas oil obtained from a coker process, cycle oil obtained from a separate fluidized catalytic cracking process or recycled from an FCC process using the present catalyst, gas oil obtained from a visbreaking process, or combinations comprising at least one of the foregoing sources or hydrogenated derivatives of the oils.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Figure 1:
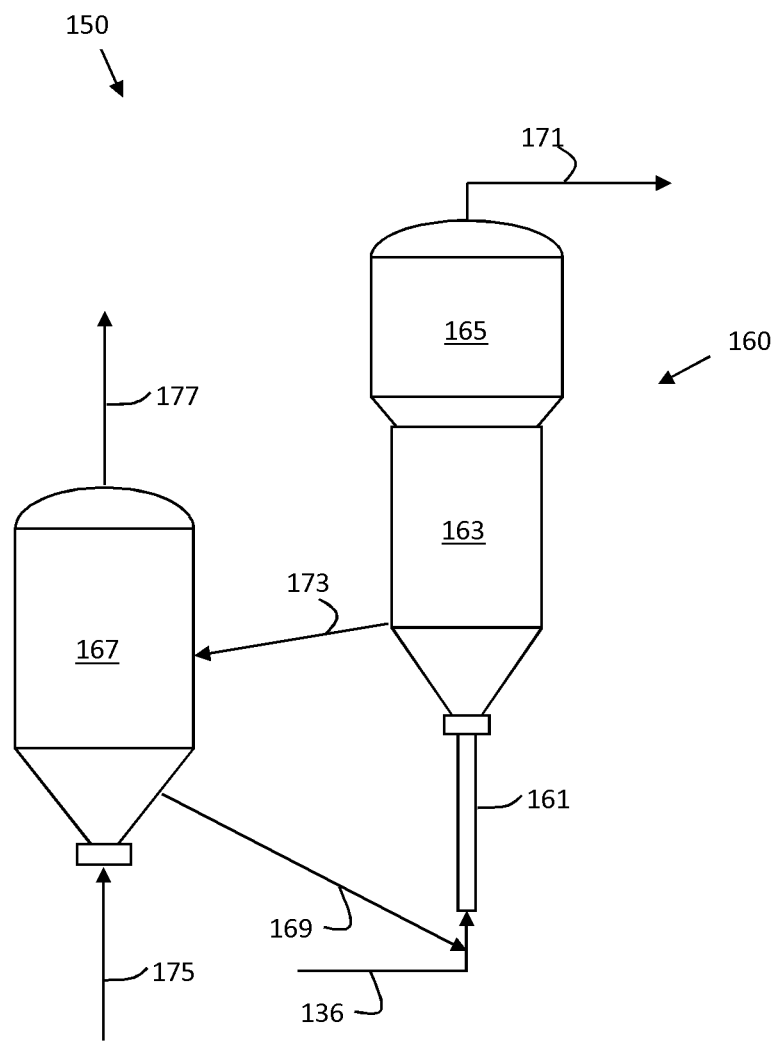
FIG. 1 is a schematic diagram of a riser fluidized catalytic cracking unit.

The present disclosure contemplates a useful and effective catalyst composition for fluidized catalytic cracking operations. The catalyst compositions are framework-substituted zeolite catalysts, including a framework-substituted ultra-stable Y-type zeolite in which a part of the framework aluminum atoms is substituted with zirconium atoms and/or hafnium atoms. Titanium atoms can also be present as a substitution in the framework for aluminum atoms.

These catalyst compositions are used alone or in effective combination with one or more additional fluidized cracking catalyst materials that are known or become known for fluidized catalytic cracking processes, to thereby form a catalyst mixture suitable for fluid catalyst cracking operations, in certain embodiments particularly to enhance production of propylene or lighter olefins and gasoline while reducing the production of dry gas and coke.

Framework-substituted Zeolite-1

The catalyst for use FCC operations for conversion of heavy hydrocarbons provided herein comprises a framework-substituted zeolite that contains zirconium atoms and/or hafnium atoms partially constituting a framework of an ultra-stable Y-type zeolite ("USY"). The framework-substituted zeolite is a USY-type zeolite in which silicon atoms and aluminum atoms form a zeolite framework and in which a portion of the aluminum atoms forming a zeolite framework is substituted with zirconium atoms, hafnium atoms or both zirconium and hafnium atoms.

As used herein, USY-type zeolite in which a portion of the aluminum atoms forming a zeolite framework is substituted with zirconium atoms, hafnium atoms or both zirconium and hafnium atoms is referred to as "framework-substituted zeolite-1." Further, framework-substituted zeolite-1 in which a part of aluminum atoms forming a zeolite framework is substituted only with zirconium atoms is referred to as a "zirconium-substituted zeolite" or "Zr-USY," the framework-substituted zeolite-1 in which a part of aluminum atoms forming a zeolite framework of the framework-substituted zeolite-1 is substituted only with hafnium atoms is referred to as a "hafnium-substituted zeolite" or "Hf-USY," and the framework-substituted zeolite-1 in which a part of aluminum atoms forming a zeolite framework is substituted only with zirconium atoms and hafnium atoms is referred to as a "zirconium-hafnium-substituted zeolite" or "Zr—Hf-USY." Zirconium atoms and/or hafnium atoms which are substituted for the aluminum atoms forming a framework of the ultra-stable Y-type zeolite serve as constituents of the framework of the ultra-stable Y-type zeolite. In the framework-substituted zeolite-1 described herein, a portion of zirconium atoms and/or hafnium atoms can optionally be carried on or combined with inner surfaces of pores, for instance, in the form of metal oxides, i.e., zirconium oxide particles and/or hafnium oxide particles. The metal oxides of zirconium and/or hafnium are combined with inner surfaces of mesopores of the USY zeolite. The zeolite having a high mesopore volume is prepared by bringing a framework substituted zeolite-1 into contact with a strongly acidic aqueous solution at a pH of about 0.8 up to and including about 2, drying the zeolite at a temperature in the range of about 50° C. to about 200° C., and firing the dry zeolite at about 350° C. to about 600° C., to prepare a zeolite in which metal oxide ultrafine particles are combined with (also referred to as "carried on") inner surfaces of pores. The procedure is described in more detail in Japanese Unexamined Patent Application Publication No. 2002-255537, which is incorporated herein by reference.

The framework substitution can be verified by, for example, X-ray fluorescence, high frequency plasma emission spectrometry, atomic absorption spectrometry, ultraviolet-visible-near-infrared spectrophotometry (UV-Vis-NIR), Fourier transform infrared spectroscopy (FT-IR), or nuclear magnetic resonance spectrometry (NMR). Note that in the framework-substituted zeolite in which the framework of a β-zeolite is substituted by zirconium atoms, it is known that a UV spectrum indicating the presence of zirconium atoms is shown in the range of 200 nanometers (nm) to 220 nm (for example, see FIG. 3 in "B. Rakshe et al., Journal of Catalysis 188, 252, 1999").

The framework-substituted zeolite-1 herein generally contains zirconium atoms and/or hafnium atoms in the range of about 0.1% to about 5%, in certain embodiments about 0.2% to about 4%, and in further embodiments about 0.3% to about 3%, as a mass percentage of in terms of zirconium and/or hafnium oxide (i.e., $ZrO_2$ and/or $HfO_2$), based on the framework-substituted zeolite-1. In this regard, a content range (based on oxides) of zirconium atoms and/or hafnium atoms includes all of the contents of zirconium atoms and/or hafnium atoms substituted for aluminum atoms forming a zeolite framework and zirconium atoms and/or hafnium atoms which are not substituted for the aluminum atoms, e.g., carried on inner surfaces of the pores of the framework-substituted zeolite-1.

The zirconium and/or hafnium content of the framework-substituted zeolite-1 of less than about 0.1% by mass in terms of oxide based on a mass of the framework-substituted zeolite-1 does not result in an effective amount of a solid acid for FCC reactions of hydrocarbon oil. Similarly, a zirconium atom and/or hafnium atom content exceeding about 5% by mass in terms of oxide based on the mass of the framework-substituted zeolite-1 does not result in an effective pore volume for FCC reactions of hydrocarbon oil, and it is thus prone to reduce the catalytic activity.

In additional embodiments of the zeolite-1 including zirconium-substituted zeolite, hafnium-substituted zeolite and/or zirconium-hafnium-substituted zeolite, framework substitutions of titanium atoms can be provided for a portion of the aluminum atoms forming the zeolite framework. In these embodiments, titanium atoms can be contained in the framework-substituted zeolite-1 in a proportion in the range of about 0.1% to about 5%, in certain embodiments about 0.5% to about 4%, and in further embodiments about 0.6% to about 3%, as a mass percentage of in terms of titanium oxide (i.e., $TiO_2$), based on the framework-substituted zeolite-1.

In this regard, if a content of the above titanium atoms in the framework-substituted zeolite-1 is less than about 0.1% by mass in terms of oxide, an amount of a solid acid which is effective for a fluidized catalytic cracking reactor is not obtained when a catalyst prepared by using the above framework-substituted zeolite-1 as a support is applied to a fluidized catalytic cracking reactor, and therefore an activity of hydrocarbon oil in a fluidized catalytic cracking reactor tends to be reduced. Similarly, if a content of titanium atoms in the framework-substituted zeolite-1 exceeds about 5% by mass in terms of oxide, a pore volume which is effective for a fluidized catalytic cracking reactor is not obtained when a catalyst prepared by using the above framework-substituted zeolite-1 as a support is applied to a fluidized catalytic cracking reactor, and therefore an activity of hydrocarbon oil in a fluidized catalytic cracking reactor tends to be reduced. A content of titanium atoms in the framework-substituted zeolite-1 can be measured by, for example, an X-ray fluorescence analyzer, a high frequency plasma emission spectrometer, an atomic absorption spectrometer or the like.

Framework-substituted Zeolite-2 (Constitution)

In additional embodiments of an FCC catalyst herein, a framework-substituted zeolite (hereinafter referred to as "a framework-substituted zeolite-2") in which a part of aluminum atoms forming the ultra-stable Y-type zeolite is substituted only with titanium atoms and/or an inorganic acid (limited to inorganic acids which do not correspond to those used in the framework-substituted zeolite-1) in addition to the framework-substituted zeolite-1 described above may be contained as a support. Titanium atoms which are not substituted for the above aluminum atoms may be contained in the framework-substituted zeolite-2 ("the framework-substituted zeolite-2" is referred to as "the titanium-substituted zeolite" or "Ti-USY").

The zeolite-2 can be prepared as described in PCT Publication WO2007/032232, which is incorporated herein by reference, in which a catalyst including as a support, a Y-type zeolite containing a titanium atom incorporated into a zeolite framework (in other words, a Y-type zeolite in which aluminum atoms constituting the framework are substituted with titanium atoms) has been developed. The above zeolite can be prepared by treating a Y-type zeolite with an acidic aqueous solution containing titanium at a pH of about 1.5 or less, followed by filtering, washing, and drying. Thereby, the zeolite can be made to contain titanium atoms incorporated into a zeolite framework structure without clogging mesopores.

The framework-substituted zeolite-2 herein generally contains titanium atoms in the range of about 0.1% to about 5%, in certain embodiments about 0.5% to about 4%, and in further embodiments about 0.6% to about 3%, as a mass percentage of in terms of titanium oxide (i.e., $TiO_2$), based on the framework-substituted zeolite-2. A content range (based on oxide) of the above titanium atoms includes all of the contents of titanium atoms substituted for aluminum atoms forming a zeolite framework and titanium atoms which are not substituted for the above aluminum atoms.

The titanium content of the framework-substituted zeolite-2 of less than about 0.1% by mass in terms of oxide based on a mass of the framework-substituted zeolite-2 does not result in an effective amount of a solid acid for a FCC reactor and is thus prone to reduce catalytic activity with the hydrocarbon oil in an FCC reactor.

Characteristics of Framework-substituted Zeolite-1 and Framework-substituted Zeolite-2

Certain ranges of crystal lattice constant, specific surface area, and silica-alumina ratio are provided for the framework-substituted zeolite-1 and the framework-substituted zeolite-2. In the fluidized catalytic cracking catalyst for hydrocarbon oil according to the present invention, a specific surface area thereof falls preferably in a range of 200 to 450 m$^2$/g; a volume of pores having a diameter of 600 Å or less falls preferably in a range of 0.40 to 0.75 ml/g; and a carrying amount of the cracking metal component falls preferably in a range of 0.01 to 40% by mass.

Lattice Constant (UD)

The framework-substituted zeolite-1 and zeolite-2 materials herein have a crystal lattice constant in the range of 2.430 nm to 2.450 nm and in certain embodiments in the range of 2.435 nm to 2.445 nm. A crystal lattice constant of framework-substituted zeolite-1 or zeolite-2 of less than 2.430 nm tends to reduce the activity of the FCC catalyst using the respective framework-substituted zeolites as supports because of a high $SiO_2/Al_2O_3$ molar ratio in the framework structure, and a small number of solid acid sites serving as active sites for the hydrocarbon cracking. A crystal lattice constant of the framework-substituted zeolite-1 or zeolite-2 exceeding 2.450 nm results in breakage of the crystal structure of the framework-substituted zeolite-1 or zeolite-2 during FCC reactions because of low heat resistance, and tends to cause a reduction in the activity of the FCC catalyst using the respective framework-substituted zeolites as supports.

The crystal lattice constant can be measured by reference to ASTM method D3942. The angle of Kα at the (111) plane of titanium oxide (anatase) is determined using silicon (Si) serving as a primary reference material. X-ray diffraction peaks from the (533) and (642) planes of Y zeolite are measured using titanium oxide serving as a secondary reference material.

Specific Surface Area (SA)

The framework-substituted zeolite-1 and zeolite-2 described herein possesses a specific surface area in the range of about 600 m$^2$/g to about 900 m$^2$/g, and in certain embodiments about 650 m$^2$/g to about 800 m$^2$/g. This specific surface area is a value determined by the BET (Brunauer-Emmett-Teller) method using nitrogen adsorption. A specific surface area of the framework-substituted zeolite-1 of less than about 600 m$^2$/g potentially reduces the number of solid acid sites effective catalytic activity in the FCC reaction. A specific surface area exceeding about 900 m$^2$/g is, at the time of filing the instant application, impractical due to production limitations, however advantages can be found if developments in processing the zeolite material are discovered.

Molar Ratio of $SiO_2$ to $Al_2O_3$ (Silica-alumina Ratio)

The framework-substituted zeolite-1 and zeolite-2 described herein generally has a molar ratio of $SiO_2$ to $Al_2O_3$ (silica-alumina ratio) generally in the range of about 5:1 to about 100:1, in certain embodiments about 20:1 to about 100:1, and in additional embodiments about 25:1 to about 80:1. A silica-alumina ratio of less than about 20 and in certain embodiments less than about 5 does not result in an effective pore volume and is thus liable to cause a reduction in activity in cracking reactions. A silica-alumina ratio of the framework-substituted zeolite-1 exceeding about 100 tends to cause a reduction in cracking activity due to a reduced number of solid acid sites.

Method for Producing the Framework-substituted Zeolite-1

A portion of the aluminum atoms within the USY zeolite framework are substituted with zirconium atoms. In certain embodiments, zeolite-1 is further treated to substitute part of the aluminum atoms within the framework with titanium atoms, used as the FCC catalyst composition and referred to herein as "USY zeolite." The disclosure of WO 2012/018819, which is commonly owned at the time of invention and incorporated herein by reference, describes a similar catalyst composition useful for hydrotreating operations, and the same synthesis procedures can be followed.

In certain embodiments, a framework-substituted zeolite-1 is produced by firing an ultra-stable Y-type zeolite at about 500° C. to about 700° C., the ultra-stable Y-type zeolite having a crystal lattice constant of 2.430 to 2.450 nm, a specific surface area of about 600 to about 900 m$^2$/g, and a molar ratio of $SiO_2$ to $Al_2O_3$ generally in the range of about 5:1 to about 100:1, in certain embodiments about 20:1 to about 100:1, and in additional embodiments about 25:1 to about 80:1. A suspension is formed containing the fired ultra-stable Y-type zeolite, the suspension having a liquid/solid mass ratio of 5 up to and including 15. An inorganic acid or an organic acid is added so that a pH of the suspension is about 1.0 to about 2.0. Subsequently a solution containing a zirconium compound and/or a hafnium compound is mixed. The solution is neutralized with, for example, an aqueous ammonia, so that the pH is about 7.

Ultra-stable Y-Type Zeolite

Ultra stable Y-type zeolite is used a raw material in one embodiment of a method for manufacturing the herein framework-substituted zeolite-1. Production methods for ultra-stable Y-type zeolite are known to a person having ordinary skill in the art. The ultra-stable Y-type zeolite used in the embodiments of manufacturing methods herein is generally zeolite having a crystal lattice constant (UD) in the range of 2.430 to 2.450 nm, a specific surface area of about 600 to about 900 m$^2$/g, and a molar ratio of SiO$_2$ to Al$_2$O$_3$ generally in the range of about 5:1 to about 100:1, in certain embodiments about 20:1 to about 100:1, and in additional embodiments about 25:1 to about 80:1.

For instance, one production method for the above ultra-stable Y-type zeolite, a Y-type zeolite (Na—Y) synthesized by a common method is subjected to the exchange of sodium ions with ammonium ions by a conventional method, for example: dispersing Y-type zeolite in water to prepare a suspension, adding ammonium sulfate thereto, washing the solid matter with water, washing it with an ammonium sulfate aqueous solution at temperature in the range of about 40° C. to about 80° C., subsequently washing it with water at temperature in the range of about 40° C. to about 95° C., and drying at about 100° C. to about 180° C. for about 30 minutes. Accordingly an ammonium-exchanged Y-type zeolite, NH$_4$—$^{50\ to\ 70}$Y, in which about 50 weight % to about 70 weight % of Na contained in the Y-type zeolite is substituted with NH$_4$.

Subsequently, a hydrogen type Y-type zeolite (HY) is prepared by calcining the above ammonium-exchanged Y-type zeolite (NH$_4$—$^{50\ to\ 70}$Y) at about 500° C. to about 800° C. for about 10 minutes to about 10 hours in, for example, a saturated vapor atmosphere. Then, an ammonium-exchanged Y-type zeolite (NH$_4$—$^{80\ to\ 97}$Y) in which about 80 weight % to 97 weight % of Na contained in the initial Y-type zeolite (Na—Y) is ion-exchanged with NH$_4$ is obtained by dispersing the hydrogen type Y-type zeolite obtained above in water at a temperature of about 40° C. to about 95° C. to prepare a suspension, adding ammonium sulfate thereto, then stiffing the suspension at a temperature of about 40° C. to about 95° C. for about 10 minutes to about 3 hours, further washing the solid matter with water a temperature of about 40° C. to about 95° C., next washing it with an ammonium sulfate aqueous solution a temperature of about 40° C. to about 95° C., subsequently washing it with water a temperature of about 40° C. to about 80° C. and then drying it at about 100° C. to 180° C. for about 30 minutes to about 30 hours. In certain embodiments the final ammonium ion exchange rate is about 90% or greater.

The ammonium-exchanged Y zeolite (NH$_4$—$^{80\ to\ 97}$Y) thus obtained is calcined at about 500° C. to about 700° C. for about 10 minutes to about 10 hours in, for example, a saturated vapor atmosphere. Accordingly an ultra-stable Y-type zeolite (USY) is prepared having a crystal lattice constant (UD) of 2.430 nm or more and 2.450 nm or less, a specific surface area of about 600 m$^2$/g to about 900 m$^2$/g and a molar ratio of SiO$_2$ to Al$_2$O$_3$ of about 5:1 to about 100:1.

In the method for producing the catalyst herein, non-framework aluminum (aluminum atoms which do not form part of the zeolite framework) can be removed from the ultra-stable Y-type zeolite described above which is the raw material in order to obtain the ultra-stable Y-type zeolite having a crystal lattice constant of 2.430 to 2.450 nm. Non-framework aluminum can be removed by, for example, a method of dispersing the ultra-stable Y-type zeolite described above in water at a temperature of about 40° C. to about 95° C. to prepare a suspension, adding sulfuric acid to the thus-formed suspension and stiffing it for about 10 minutes to about 3 hours while maintaining the temperature at about 40° C. to about 95° C. to thereby dissolve the non-framework aluminum. After dissolving the non-framework aluminum, the suspension is filtrated, and a residue on the filter is washed with purified water at about 40° C. to about 95° C. and dried at a temperature of about 100° C. to 180° C. for about 3 to about 30 hours, whereby an ultra-stable Y-type zeolite from which the non-framework aluminum is removed can be obtained.

In the method for producing the catalyst herein, the ultra-stable Y-type zeolite which is the raw material is calcined at a temperature of about 500° C. to about 700° C., in certain embodiments at temperature of about 550° C. to about 650° C. The time of calcining is typically not critical so long as the targeted framework-substituted zeolite-1 is obtained, for instance, in a range of about 30 minutes to about 10 hours. If the calcining temperature of the ultra-stable Y-type zeolite is lower than about 500° C., the framework substitution amount of zirconium atoms, hafnium atoms and titanium atoms tends to be reduced when carrying out framework substitution treatment by zirconium atoms, hafnium atoms or titanium atoms at a subsequent step as compared to calcining at about 500° C. to about 700° C. At calcining temperatures that exceed 700° C., the specific surface area of the ultra-stable Y-type zeolite can be reduced, and a framework substitution amount of zirconium atoms, hafnium atoms and titanium atoms is thus reduced when carrying out framework substitution treatment by zirconium atoms, hafnium atoms or titanium atoms at a subsequent step. The calcining atmosphere of the ultra stable Y-type zeolite is in certain embodiments air.

The calcined ultra-stable Y-type zeolite is suspended in water having a temperature of about 20° C. to about 30° C. to form a suspension. With respect to the concentration of the suspension of the ultra-stable Y-type zeolite, the liquid/solid mass ratio is generally in the range of about 5:1 to about 15:1, and in certain embodiments more in the range of about 8:1 to about 12:1.

Next, an inorganic acid or an organic acid is added thereto so that a pH of the suspension described above is controlled to a range of about 1.0 to about 2.0, and subsequently a solution containing a zirconium compound and/or a hafnium compound is added and admixed. The thus mixed solution is neutralized (e.g., to a pH of about 7.0 to about 7.5), and dried (e.g., at a temperature of about 80° C. to about 180° C.), whereby the framework-substituted zeolite-1 described above can be obtained.

The inorganic acid use can generally be sulfuric acid, nitric acid, hydrochloric acid and the like. In certain embodiments the selected inorganic acid is sulfuric acid or hydrochloric acid. Further, carboxylic acids can suitably be used as the organic acid described above. The quantity of inorganic acid or organic acid is not critical, so long as the pH of the suspension is controlled in the range of about 1.0 to about 2.0. For example, a 0.5- to 4.0-fold molar amount, and in certain embodiments a 0.7- to 3.5-fold molar, amount based on an amount of Al$_2$O$_3$ in the ultra-stable Y-type zeolite, can be used, although these ranges are not critical.

Suitable zirconium compounds described above include one or more of zirconium sulfate, zirconium nitrate, zirconium chloride and the like. In certain embodiments zirconium sulfate and/or zirconium nitrate are selected. The quantity of the zirconium compound added is generally about 0.1% to about 5% by mass, and in certain embodiments about 0.2% to about 4% by mass, on a zirconium oxide basis with respect to the ultra-stable Y-type zeolite described above. The addition of the zirconium compound in an amount of less than about 0.1% by mass fails to improve solid acid characteristics of the zeolite. The addition of the zirconium compound in an amount exceeding 5% by mass tends to cause clogging of pores of the zeolite. An aqueous solution of a zirconium compound prepared by dissolving the zirconium compound in water can be used as the zirconium compound.

Suitable hafnium compounds described above include one or more of hafnium chloride, hafnium nitrate, hafnium fluoride, hafnium bromide, hafnium oxalate and the like. In certain embodiments hafnium chloride and/or hafnium nitrate are selected. The quantity of the hafnium compound added is generally about 0.1% to about 5% by mass, and in certain embodiments about 0.2% to about 4% by mass, on a hafnium oxide basis with respect to the ultra-stable Y-type zeolite. The addition of the hafnium compound in an amount of less than about 0.1% by mass fails to improve solid acid characteristics of the zeolite. An aqueous solution of a hafnium compound prepared by dissolving the hafnium compound in water can be used as the hafnium compound.

A titanium compound can be added to the mixed solution described above. Suitable titanium compounds include one or more of titanium sulfate, titanium acetate, titanium chloride, titanium nitrate, and titanium lactate. In certain embodiments titanium sulfate and/or titanium acetate are selected. The quantity of the titanium compound added is generally about 0.1% to about 5% by mass, and in certain embodiments about 0.2% to about 4% by mass, on a titanium oxide basis with respect to the ultra stable Y-type zeolite. The addition of the titanium compound in an amount of less than about 0.1% by mass results in an ineffective amount of solid acid sites of the zeolite. The addition of the titanium compound in an amount exceeding 5% by mass tends to cause clogging of pores of the zeolite. An aqueous solution of a titanium compound prepared by dissolving the titanium compound in water can be used as the titanium compound.

A pH of the above suspension is controlled to about 1.0 to about 2.0 to preventing precipitate from being generated during mixing of the aqueous solution of the zirconium compound, the hafnium compound or the titanium compound with a suspension of the ultra-stable Y-type zeolite described above.

Mixing of the aqueous solution of the zirconium compound, the hafnium compound or the titanium compound with a suspension of the ultra-stable Y-type zeolite is, in certain embodiments, conducted by gradually adding said aqueous solution to the suspension. After completion of addition of the aqueous solution described above to the suspension, the solution can be mixed by stirring at, for example, room temperature (about 25° C. to about 35° C.) for about 3 hours to about 5 hours.

Further, after completion of the above-described mixing, the admixed solution is neutralized by adding an alkali compound such as aqueous ammonia and/or the like, so that a pH thereof is controlled to about 7.0 to about 7.5, whereby the framework-substituted zeolite-1 described herein is be obtained.

In this regard, when only the zirconium compound (or an aqueous solution thereof) is used as the compound (or an aqueous solution thereof) added to the suspension described above, the framework-substituted zeolite-1 (Zr-USY) in which zirconium atoms is substituted for a part of aluminum atoms forming the framework of the ultra-stable Y-type zeolite is formed; when only the hafnium compound (or an aqueous solution thereof) is used, the framework-substituted zeolite-1 (Hf-USY) in which hafnium atoms is substituted for a part of aluminum atoms forming the framework of the ultra stable Y-type zeolite is formed; and when the zirconium compound and the hafnium compound (or aqueous solutions thereof) are used, the framework-substituted zeolite-1 (Zr.Hf-USY) in which zirconium atoms and hafnium atoms are substituted for a part of aluminum atoms forming the framework of the ultra-stable Y-type zeolite is formed.

When the titanium compound (or an aqueous solution thereof) is added in combination in adding the zirconium compound and/or the hafnium compound (or aqueous solutions thereof) to the suspension described above, the framework-substituted zeolite-1 (Zr.Hf.Ti—USY) in which zirconium atoms, hafnium atoms and titanium atoms form a part of the framework of the ultra-stable Y-type zeolite is formed.

The resulting framework-substituted zeolite-1 can be filtered, if desired, washed with water, and dried at about 80° C. to about 180° C.

Fluid Catalytic Cracking Catalyst Preparation

FCC catalyst composition comprises, for example, 15 to 60% by mass, preferably 20 to 50% by mass of zeolite, 10 to 30% by mass, preferably, 15 to 25% by mass of inorganic binder as a binding agent, and inorganic oxides other than zeolite as the balance.

The silica based binder and alumina based binder can be used as inorganic binder. The silica based binder can be any one of or two or more of silica sol, water glass (sodium silicate), and silicic acid liquid. For example, silica sol comprising $SiO_2$ at a concentration in the range of 10 to 15% by mass can be prepared by adding water glass comprising $SiO_2$ at a concentration in the range of 12 to 23% by mass and sulfuric acid having a concentration in the range of 20 to 30% by mass simultaneously and continuously. Aluminum-compound binder can be (a) basic aluminum chloride, (b) aluminum biphosphate, or (c) alumina sol. A solution obtained by dissolving any kind of or two or more kinds of crystallite alumina, such as gibbsite, bayerrite, and boehmite, in an acid solution may be used as the aluminum-compound binder instead. Here, basic aluminum chloride is expressed by Formula 1.

$$[Al_2(OH)_nCl_{6-n}]_m \qquad (1)$$

(where, 0<n<6 and 1<m<10, preferably, 4.8<n<5.3 and 3<m<7, and the symbol m represents a natural number.)

Aluminum biphosphate, also referred to as aluminum dihydrogen phosphate or primary aluminum phosphate, is expressed by $Al(H_2PO_4)_3$. Alumina sol can be produced by, for example, pH adjustment of pseudo-boehmite-type alumina with an acid.

The inorganic oxides can be, besides kaolin and other clay minerals, activated alumina, porous silica, rare-earth metal compounds, and metal capture agents (metal-trapping agents).

Any rare-earth metal oxide may be contained in catalyst, in the form of $RE_2O_3$, at a content ratio in the range of 0 to 3% by mass. Rare-earth metals used here include cerium (Ce), lanthanum (La), praseodium (Pr), and neodymium (Nd), and catalyst composition may carry any one of or two or more of these as metal oxides.

The following describes an example of the manufacturing method of catalyst component. First, kaolin, and activated alumina are added to silica sol mentioned above (an example of the silica based binder), and then slurry of TiZrUSY zeolite prepared with 20 to 30% by mass sulfuric acid to have pH in the range of 3 to 5; in this way, slurry mixture is prepared. This slurry mixture is spray-dried to form spherical particles. The obtained spherical particles are washed, brought into contact with an aqueous solution of a rare earth metal (RE) chloride for ion exchange for the content ratio of $RE_2O_3$ to be in the range of 0 to 3% by mass, and then dried; in this way, catalyst is obtained. The average particle diameter of catalyst obtained is not particularly limited, however it is on the order of 60 to 70 microns.

After USY zeolite preparation, the catalyst is quasi-equilibrated with steam, for instance, at a temperature of from about 600 to about 800° C. and for about 10 to about 20 hours.

Fluid catalytic cracking based on a catalyst for fluid catalytic cracking according to the present invention can be performed under ordinary conditions for fluid catalytic cracking of hydrocarbon oil. For example, the conditions described below can be suitably used.

Fluidized catalytic cracking of hydrocarbon oil using the herein catalyst

The FCC catalyst for hydrocarbon oil described herein is charged into a reactor vessel and suitably used for catalytic cracking of hydrocarbon oil according to known FCC processes for production of gasoline and/or light olefins including ethylene, propylene and butylenes.

In the fluidized catalytic cracking herein, the hydrocarbon oil can be derived from one or more of crude oil, synthetic crude oil, bitumen, oil sand, shale oil and coal liquid. These feeds can include petroleum fractions having a normal point above 350° C., including naphtha, diesel, vacuum gas oil (VGO), deasphalted oil (DAO) obtained from a solvent deasphalting process, demetallized oil, light or heavy coker gas oil obtained from a coker process, cycle oil obtained from a separate fluidized catalytic cracking process or recycled from an FCC process using the present catalyst, gas oil obtained from a visbreaking process, or combinations comprising at least one of the foregoing.

For example, a catalytic cracking apparatus is charged with the FCC catalyst described above, and hydrocarbon oil having a boiling point above about 350° C., in certain embodiments in the range of about 350° C. to about 850° C., can be cracked using fluidized catalytic cracking at a reaction temperature in the range of about 450° C. to about 700° C., a pressure of 1 to 10 bar, a residence or contact time in the range of about 0.1 seconds to about 60 seconds, and a catalyst to oil ratio in the range of about 2:1 to about 30:1.

In certain embodiments, a fluidized catalytic cracking unit configured with a riser reactor is provided that operates under conditions that promote formation of light olefins, particularly propylene, and that minimize light olefin-consuming reactions including hydrogen-transfer reactions. FIG. 1 is a simplified schematic illustration of a riser fluidized catalytic cracking unit. A fluidized catalytic cracking unit 150 includes a riser reactor. Fluidized catalytic cracking unit 150 includes a reactor/separator 160 having a riser portion 161, a reaction zone 163 and a separation zone 165. Fluidized catalytic cracking unit 150 also includes a regeneration vessel 167 for regenerating spent catalyst. A charge 136 is introduced to the reaction zone, in certain embodiments accompanied by steam or other suitable gas for atomization of the feed (not shown). The charge 136 is admixed and intimately contacted with an effective quantity of heated fresh or regenerated solid cracking catalyst particles which are conveyed via a conduit 169 from regeneration vessel 167. The feed mixture and the cracking catalyst are contacted under conditions to form a suspension that is introduced into the riser 361. In a continuous process, the mixture of cracking catalyst and hydrocarbon feedstock proceed upward through the riser 161 into reaction zone 163. In riser 161 and reaction zone 163, the hot cracking catalyst particles catalytically crack relatively large hydrocarbon molecules by carbon-carbon bond cleavage.

During the reaction, as is conventional in fluidized catalytic cracking operations, the cracking catalysts become coked and hence access to the active catalytic sites is limited or nonexistent. Reaction products are separated from the coked catalyst using any suitable configuration known in a fluidized catalytic cracking units, generally referred to as the separation zone 165 in a fluidized catalytic cracking unit 150, for instance, located at the top of the reactor 160 above the reaction zone 163. The separation zone can include any suitable apparatus known to those of ordinary skill in the art such as, for example, cyclones. The reaction product is withdrawn through conduit 171. Catalyst particles containing coke deposits from fluid cracking of the hydrocarbon feedstock pass through a conduit 173 to regeneration zone 167. According to the process herein, since the light solvent feedstock is combined with the heavy feedstock as the feed 136, the solvent to oil ratio in the initial solvent deasphalting/demetallizing process is selected so as to provide sufficient coking of the catalyst to provide the heat balance during regeneration.

In regeneration zone 167, the coked catalyst comes into contact with a stream of oxygen-containing gas, e.g., pure oxygen or air, which enters regeneration zone 167 via a conduit 175. The regeneration zone 167 is operated in a configuration and under conditions that are known in typical a fluidized catalytic cracking operations. For instance, regeneration zone 167 can operate as a fluidized bed to produce regeneration off-gas comprising combustion products which is discharged through a conduit 177. The hot regenerated catalyst is transferred from regeneration zone 167 through conduit 169 to the bottom portion of the riser 161 for admixture with the hydrocarbon feedstock and noted above.

In one embodiment, a suitable a fluidized catalytic cracking unit 150 that can be employed using the catalysts described herein can be similar to that described in U.S. Pat. Nos. 7,312,370, 6,538,169, and 5,326,465, which are incorporated herein by reference.

In general, the operating conditions for the reactor of a suitable riser fluidized catalytic cracking unit using the catalysts herein include:

reaction temperature of about 480° ° C. to about 650° C., in certain embodiments about 500° C. to about 620° C., and in further embodiments about 500° C. to about 600° C.;

reaction pressure of about 1 $Kg/cm^{22}$ to about 20 $Kg/cm^2$, in certain embodiments of about 1 $Kg/cm^2$ to about 10 $Kg/cm^2$, in further embodiments of about 1 $Kg/cm^2$ to about 3 $Kg/cm^2$;

contact time (in the reactor) of about 0.5 seconds to about 10 seconds, in certain embodiments of about 1 seconds to about 5 seconds, in further embodiments of about 1 seconds to about 2 seconds; and a catalyst to feed ratio of about 1:1 to about 15:1, in certain embodiments of about 1:1 to about 10:1, in further embodiments of about 8:1 to about 20:1.

Figure 2:
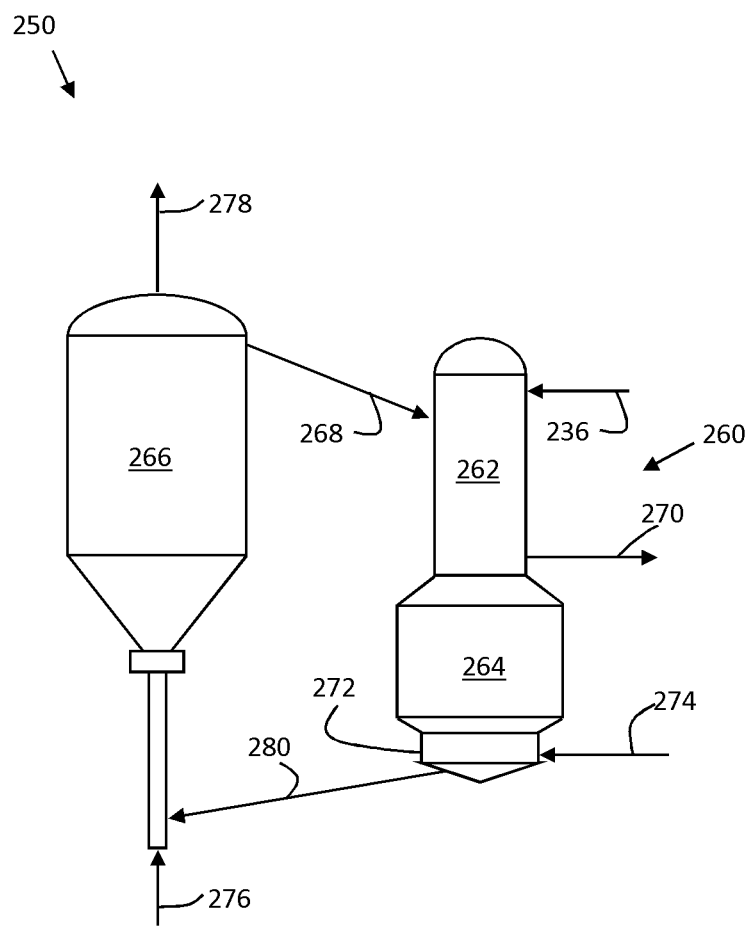
FIG. 2 is a schematic diagram of a downflow fluidized catalytic cracking unit.

In certain embodiments, a fluidized catalytic cracking unit configured with a downflow reactor is provided that operates under conditions that promote formation of light olefins, particularly propylene, and that minimize light olefin-consuming reactions including hydrogen-transfer reactions. FIG. 2 is a simplified schematic illustration of a downflow fluidized catalytic cracking unit. A fluidized catalytic cracking unit 250 includes a reactor/separator 260 having a reaction zone 262 and a separation zone 264. Fluidized catalytic cracking unit 250 also includes a regeneration zone 266 for regenerating spent catalyst. In particular, a charge 236 is introduced to the reaction zone, in certain embodiments accompanied by steam or other suitable gas for atomization of the feed (not shown). An effective quantity of heated fresh or hot regenerated solid cracking catalyst particles from regeneration zone 266 is conveyed to the top of reaction zone 262 also transferred, e.g., through a downwardly directed conduit or pipe 268, commonly referred to as a transfer line or standpipe, to a withdrawal well or hopper (not shown) at the top of reaction zone 262. Hot catalyst flow is typically allowed to stabilize in order to be uniformly directed into the mix zone or feed injection portion of reaction zone 262. The charge 236 is injected into a mixing zone through feed injection nozzles typically situated proximate to the point of introduction of the regenerated catalyst into reaction zone 262. These multiple injection nozzles result in the catalyst and oil mixing thoroughly and uniformly. Once the charge contacts the hot catalyst, cracking reactions occur.

The reaction vapor of hydrocarbon cracked products, unreacted feed and catalyst mixture quickly flows through the remainder of reaction zone 262 and into the rapid separation zone 264 at the bottom portion of reactor/separator 260. Cracked and uncracked hydrocarbons are directed through a conduit or pipe 270 to a conventional product recovery section known in the art to yield fluidized catalytic cracking products light olefins, gasoline and cycle oil, with a maximized propylene yield. If necessary for temperature control, a quench injection can be provided near the bottom of reaction zone 262 immediately before the separation zone 264. This quench injection quickly reduces or stops the cracking reactions and can be utilized for controlling cracking severity.

The reaction temperature, i.e., the outlet temperature of the downflow reactor, can be controlled by opening and closing a catalyst slide valve (not shown) that controls the flow of regenerated catalyst from regeneration zone 266 into the top of reaction zone 262. The heat required for the endothermic cracking reaction is supplied by the regenerated catalyst. By changing the flow rate of the hot regenerated catalyst, the operating severity or cracking conditions can be controlled to produce the desired product slate. A stripper 272 is also provided for separating oil from the catalyst, which is transferred to regeneration zone 266. The catalyst from separation zone 264 flows to the lower section of the stripper 272 that includes a catalyst stripping section into which a suitable stripping gas, such as steam, is introduced through streamline 274. The stripping section is typically provided with several baffles or structured packing (not shown) over which the downwardly flowing catalyst 280 passes counter-currently to the flowing stripping gas. The upwardly flowing stripping gas, which is typically steam, is used to "strip" or remove any additional hydrocarbons that remain in the catalyst pores or between catalyst particles. The stripped or spent catalyst is transported by lift forces from the combustion air stream 276 through a lift riser of the regeneration zone 264. This spent catalyst, which can also be contacted with additional combustion air, undergoes controlled combustion of any accumulated coke. Flue gases are removed from the regenerator via conduit 278. In the regenerator, the heat produced from the combustion of the by-product coke is transferred to the catalyst raising the temperature required to provide heat for the endothermic cracking reaction in the reaction zone 262. According to the process herein, since the light solvent feedstock is combined with the heavy feedstock as the feed 236, the solvent to oil ratio in the initial solvent deasphalting/demetallizing process is selected so as to provide sufficient coking of the catalyst to provide the heat balance during regeneration.

In one embodiment, a suitable fluidized catalytic cracking unit 250 that can be employed in the process described herein can be similar to those described in U.S. Pat. No. 6,656,346, and US Patent Publication Number 2002/0195373, both of which are incorporated herein by reference. Important properties of downflow reactors include introduction of feed at the top of the reactor with downward flow, shorter residence time as compared to riser reactors, and high catalyst to oil ratio, e.g., in the range of about 20:1 to about 30:1.

In general, the operating conditions for the reactor of a suitable propylene production downflow FCC unit include
 reaction temperature of about 550° C. to about 650° C., in certain embodiments about 580° C. to about 630° C., and in further embodiments about 590° C. to about 620° C.;
 reaction pressure of about 1 Kg/cm$^2$ to about 20 Kg/cm$^2$, in certain embodiments of about 1 Kg/cm$^2$ to about 10 Kg/cm$^2$, in further embodiments of about 1 Kg/cm$^2$ to about 3 Kg/cm$^2$;
 contact time (in the reactor) of about 0.1 seconds to about 30 seconds, in certain embodiments about 0.1 seconds to about 10 seconds, and in further embodiments about 0.2 seconds to about 0.7 seconds; and
 a catalyst to feed ratio of about 1:1 to about 40:1, in certain embodiments about 1:1 to about 30:1, and in further embodiments about 10:1 to about 30:1.

In the interest of clarity, in the descriptions above of the FCC units, the numerous valves, temperature sensors, electronic process controllers and the like that are customarily employed, and that are well known to those of ordinary skill in the art of solvent deasphalting/demetallizing and fluidized catalyst cracking, are not included in the attached schematic illustration. Accessory systems that are utilized in conventional fluidized catalyst cracking systems such as, for example, air supply, catalyst hoppers, torch oil supply, flue gas handling and heat recovery, fresh and spent catalyst hoppers for storage of make-up and used/equilibrium catalyst that can be added to, or removed from the regenerator, are not shown.

EXAMPLE

Analytical methods used in the present invention shall be described below.

Composition Analysis

An X-ray fluorescence analyzer ("RIX3000" manufactured by Rigaku Corporation) was used to carry out composition analysis (Zr, Hf, Ti) of a sample. A sample for measurement was prepared by glass bead method. To be specific, 5 g of the sample was put in a vinyl chloride-made ring having an inner diameter of 35 nm and molded by applying a pressure of 20 t for 20 seconds by means of a pressure molding machine to prepare the sample for measurement. Conditions of the X-ray fluorescence analysis are shown below; target: Rh, analyzing crystal: LiF, detector: scintillation counter, excitation: Rh vessel of 4 kW, measuring voltage: 55 kV, current: 70 mA.

Measurement of Sodium in Zeolite

An atomic absorption spectrometer ("Z5300" manufactured by HORIBA Ltd.) was used to measure a sodium content in a sample (zeolite). The measuring wavelength range was controlled to 190 to 900 nm.

Crystal Lattice Constant:

An X-ray diffractometer ("RINT2100" manufactured by Rigaku Corporation) was used to measure an X-ray diffraction peak of a sample (zeolite), and the crystal lattice constant was calculated from the result thereof. A method for calculating the crystal lattice constant has already been described in the present specification. Conditions of the X-ray diffraction are shown below; vessel: Cu-K (α ray), 2 θ scanning range: 20 to 50deg, scanning speed: 0.01deg/minute, scanning step: 0.01deg.

Crystallinity:

The crystallinity was calculated from an X-ray diffraction peak of a sample (zeolite). A calculating method therefore has already been described in the present specification.

$SiO_2/Al_2O_3$ Molar Ratio:

A peak intensity ratio of Si and Al was determined from an X-ray diffraction peak of a sample (zeolite), and it was produced to a molar ratio of $SiO_2$ to $Al_2O_3$.

Specific Surface Area and Pore Volume:

An adsorption measuring equipment (fully automatic gas adsorption equipment "AUTOSORB-1" manufactured by Quantachrome Instrument Corporate) was used to subject 0.02 to 0.05 g of a sample (zeolite or the hydrocracking catalyst) to deaeration at room temperature for 5 hours, and then an adsorption desorption isothermal curve was measured under liquid nitrogen temperature to calculate a specific surface area per mass using BET equation of a multipoint method.

Example 1

After USY zeolite preparation, the catalyst is quasi-equilibrated with steam, for instance, at a temperature of 750° C. for 13 hours. The catalyst was fresh and did not contain any metals. This preparation step is conducted in order to prepare the catalyst for FCC catalyst performance testing, as illustrated in Table 1.

FCC Catalyst A
Ultra Stable Y Zeolite

First, 50.0 kg of a NaY zeolite (hereinafter, also referred to as "NaY") having a $SiO_2/Al_2O_3$ molar ratio of 5.2, a unit cell dimension (UD) of 2.466 nm, a specific surface area (SA) of 720 m²/g, and a $Na_2O$ content of 13.0% by mass was suspended in 500 liter (hereinafter, also expressed as "L") of water having a temperature of 60° C. Furthermore, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 of water having a temperature of 60° C., washed with 500 of water having a temperature of 60° C., dried at 130° C. for 20 hours, thereby affording about 45 kg of a Y zeolite ($NH_4^{65}Y$) in which 65% of sodium (Na) contained in NaY was ion-exchanged with ammonium ion. A content of $Na_2O$ in $NH_4^{65}Y$ was 4.5% by mass.

$NH_4^{65}Y$ 40 kg was fired in a saturated water vapor atmosphere at 670° C. for 1 hour to form a hydrogen-Y zeolite (HY). HY was suspended in 400 of water having a temperature of 60° C. Then 49.0 kg of ammonium sulfate was added thereto. The resulting mixture was stirred at 90° C. for 1 hour and washed with 200 of water having a temperature of 60° C. The mixture was then dried at 130° C. for 20 hours, thereby affording about 37 kg of a Y zeolite ($NH_4^{95}Y$) in which 95% of Na contained in the initial NaY was ion-exchanged with $NH_4$. $NH_4^{95}Y$ 33.0 kg was fired in a saturated water vapor atmosphere at 650° C. for 1 hour, thereby affording about 15 kg of a ultra-stable Y zeolite (hereinafter, also referred to as "USY(a)") having a $SiO_2/Al_2O_3$ molar ratio of 5.2, a unit cell dimension (UD) of 2.438 nm, a crystallinity of 98%, a specific surface area (SA) of 635 m²/g, and a $Na_2O$ content of 0.60% by mass.

Next, 2.0 kg of this USY(a) was suspended in 20 of water having a temperature of 25° C. 3.82 kg of 25% sulfuric acid by mass was prepared. Then 106 g of a solution containing 18% zirconium sulfate by mass and 37 g of a solution containing 33% titanium sulfate by mass added. The resulting mixture was stirred for 1 hour at room temperature. The solution was added to suspended USY solution and stirred for 3 hours at room temperature. After the mixture was filtered and the resulting solid was washed with 20 of water and dried at 130° C. for 20 hours, about 1.2 kg of a titanium-zirconium-substituted zeolite (hereinafter, also referred to as "Ti—Zr-USY") was recovered having a $SiO_2/Al_2O_3$ molar ratio of 29.6, a unit cell dimension (UD) of 2.436 nm, a crystallinity of 83%, a specific surface area (SA) of 697 m²/g, a $TiO_2$ content of 0.96% by mass, and a $ZrO_2$ content of 0.49% by mass.

Silica sol comprising $SiO_2$ at a concentration of 12.5% by mass (an example of the silica-based binder) was prepared with a weight of 4000 g by adding 2941 g of water glass comprising $SiO_2$ at a concentration of 17% by mass and 1059 g of sulfuric acid having a concentration of 25% by mass simultaneously and continuously. To this silica sol, 950 g of kaolin, and 250 g of activated alumina, weights given on a dry weight basis, were added, and 800 g of a TiZrUSY zeolite slurry prepared with 25% by mass sulfuric acid to have pH of 3.9 was added. This slurry mixture was spray-dried to form spherical particles having an average particle diameter of 60 micron. The obtained spherical particles were washed, brought into contact with an aqueous solution of a rare earth metal (RE) chloride (this solution contained chlorides of cerium and lanthanum; the same applies hereinafter) for ion exchange for the content ratio of $RE_2O_3$ to be 1.0% by mass, and then dried in an oven at 135° C. In this way, FCC catalyst A, having a specific surface area (SA) of 279 m²/g, a $TiO_2$ content of 1.19% by mass, a $ZrO_2$ content of 0.53% by mass, a $Al_2O_3$ content of 23.2% by mass, a rare-earth oxide content of 0.78% by mass.

Fluid Catalytic Cracking Reaction Test

Fluid catalytic cracking catalyst performance testing is carried out in ASTM micro-activity test (MAT) equipment and protocols defined in ASTM method number D3907-03 (2008), entitled "Standard Test Method for Testing Fluid Catalytic Cracking (FCC) Catalysts by Microactivity Test"

Prior to the reaction test, catalyst for fluid catalytic cracking was quasi-equilibrated with steam, at a temperature of 750° C. for 13 hours.

Two set of ASTM-MAT tests were conducted using VGO derived from Arabian crude oils, the properties of which are shown in Table 1. The tests were carried-out at two temperatures, 515° C. (conventional FCC conditions) and 600° C., (propylene production FCC conditions), using a catalyst to oil ratios in the range of 3:1 to 6:1, and at residence times of 30 seconds. Both liquid and gas products were collected and analyzed using gas chromatography. Conversion and products yields were calculated on mass basis.

After completion of the ASTM-MAT, the catalyst sample was collected from the testing reactor and the amount of solid coke deposits was measured. Gas products should be analyzed for the following components: hydrogen, methane, ethane, propane, propylene, iso- and normal-butane, and butenes. Liquid products analyzed for the following components: gasoline, which has a boiling range from pentane boiling point to a temperature of 216° C., light cycle oil (LCO), which has a boiling point range from 216° C. to 343°

C., and heavy cycle oil (HCO), which has a boiling point of 343° C. and higher, denoted as 343+ fraction.

The conversion is typically calculated as the sum of the mass percent of gas products plus coke and plus gasoline fractions. The products yields are defined as the percentile of the product component, on mass basis, divided by the total weight of all the products, which include gas, liquid and solid products.

Tables 2 and 3 illustrate the conversion and product yields of catalyst contained Ti—Zr inserted USY zeolite at conventional FCC conditions and propylene production conditions, respectively.

TABLE 1 properties Vacuum Gas Oil

| Property | Method | Unit | Value |
|---|---|---|---|
| Density | | g/cc | 0.882 |
| API | | ° | 29.1 |
| Carbon | | W % | 85.08 |
| Hydrogen | | W % | 12.08 |
| Sulfur | | W % | 2.46 |
| Nitrogen | | ppmw | 960 |
| SimDist | D2887 | | |
| IBP | | ° C. | 214 |
| 5/10 V % | | ° C. | 311/337 |
| 40/50 | | ° C. | 409/428 |
| 70/90 | | ° C. | 468/518 |
| FBP | | ° C. | 588 |

TABLE 2

MAT testing results for FCC catalyst A at Conventional FCC conditions

| | RUN No. | | | |
|---|---|---|---|---|
| | 1 | 2 | 3 | 4 |
| Cracking T, (° C.) | 515 | 515 | 515 | 515 |
| T.O.S.(s) | 30 | 30 | 30 | 30 |
| CAT/OIL (wt/wt) | 3.11 | 4.06 | 5.12 | 6.60 |
| CONV.(%) | 54.10 | 68.48 | 72.58 | 78.41 |
| Yields (wt %) | | | | |
| Hydrogen | 0.02 | 0.03 | 0.03 | 0.04 |
| Methane | 0.31 | 0.45 | 0.42 | 0.63 |
| Ethane | 0.37 | 0.53 | 0.46 | 0.67 |
| Ethylene | 0.49 | 0.72 | 0.63 | 0.91 |
| Propane | 0.44 | 0.70 | 0.76 | 0.98 |
| Propylene | 2.95 | 4.22 | 4.65 | 5.29 |
| Isobutane | 2.06 | 3.23 | 3.73 | 4.20 |
| n-Butane | 0.34 | 0.56 | 0.68 | 0.80 |
| 1-Butene | 1.22 | 1.75 | 1.94 | 2.06 |
| Isobutylene | 0.87 | 1.24 | 1.37 | 1.47 |
| c-2-Butene | 1.40 | 1.81 | 1.81 | 1.80 |
| t-2-Butene | 0.86 | 1.23 | 1.39 | 1.44 |
| 1,3 Butadiene | 0.00 | 0.00 | 0.00 | 0.00 |
| Gasoline | 41.46 | 50.14 | 52.14 | 54.78 |
| LCO | 20.55 | 18.08 | 17.20 | 14.30 |
| HCO | 25.35 | 13.44 | 10.22 | 7.29 |
| Coke | 1.32 | 1.84 | 2.57 | 3.33 |
| Groups (wt %) | | | | |
| Dry gas (H2-C2) | 1.19 | 1.73 | 1.54 | 2.26 |
| LPG (C3-C4) | 10.14 | 14.76 | 16.33 | 18.04 |
| Light olefins (C2= - C4=) | 7.78 | 10.99 | 11.79 | 12.97 |
| LPG Olefins (C3= + C4=) | 7.29 | 10.26 | 11.16 | 12.06 |
| Total Butenes (C4=) | 4.34 | 6.04 | 6.50 | 6.77 |
| Total Gas | 11.32 | 16.49 | 17.87 | 20.29 |

TABLE 3

MAT testing results for FCC catalyst A at propylene production FCC conditions

| | RUN No. | | | |
|---|---|---|---|---|
| | 5 | 6 | 7 | 8 |
| Cracking T, (° C.) | 600 | 600 | 600 | 600 |
| T.O.S.(s) | 30 | 30 | 30 | 30 |
| CAT/OIL (wt/wt) | 3.28 | 4.25 | 5.53 | 6.73 |
| CONV.(%) | 75.21 | 80.31 | 82.94 | 83.40 |
| Yields (wt %) | | | | |
| Hydrogen | 0.08 | 0.09 | 0.11 | 0.12 |
| Methane | 1.67 | 1.89 | 2.28 | 2.06 |
| Ethane | 1.72 | 1.85 | 2.23 | 1.91 |
| Ethylene | 2.46 | 2.60 | 3.05 | 2.51 |
| Propane | 1.28 | 1.49 | 1.79 | 1.81 |
| Propylene | 7.14 | 8.13 | 9.40 | 9.26 |
| Isobutane | 1.69 | 2.05 | 2.32 | 2.93 |
| n-Butane | 0.63 | 0.76 | 0.92 | 1.02 |
| 1-Butene | 2.38 | 2.73 | 3.06 | 2.95 |
| Isobutylene | 1.98 | 2.24 | 2.52 | 2.44 |
| c-2-Butene | 3.02 | 3.33 | 3.69 | 3.55 |
| t-2-Butene | 1.79 | 2.05 | 2.29 | 2.22 |
| 1,3 Butadiene | 0.05 | 0.05 | 0.05 | 0.05 |
| Gasoline | 47.79 | 48.93 | 46.20 | 47.22 |
| LCO | 15.30 | 12.69 | 11.31 | 11.03 |
| HCO | 9.49 | 7.00 | 5.75 | 5.57 |
| Coke | 1.54 | 2.13 | 3.05 | 3.35 |
| Groups (wt %) | | | | |
| Dry gas (H2-C2) | 5.92 | 6.43 | 7.67 | 6.60 |
| LPG (C3-C4) | 19.96 | 22.82 | 26.03 | 26.23 |
| Light olefins (C2= - C4=) | 18.81 | 21.12 | 24.05 | 22.98 |
| LPG Olefins (C3= + C4=) | 16.36 | 18.52 | 21.00 | 20.47 |
| Total Butenes (C4=) | 9.22 | 10.39 | 11.60 | 11.20 |
| Total Gas | 25.88 | 29.25 | 33.69 | 32.83 |

Liquid and gas products were analyzed using gas chromatography (GC) equipment. Weight percent yields are the mass of the component divided by the total mass of the products. Conversion is calculated as the total mass of the products divided by total mass of feedstock.

In Tables 2 and 3, the sum of hydrogen, $C_1+C_2$ and $C_3$ is referred to as dry gas. Propylene is noted as $C_3=$. The sum of iso-$C_4$, n-$C_4$, and $C_4=$ is referred as light olefins. LCO refers to light cycle oil and HCO refers to heavy cycle oil, both streams being typical products of FCC process.

Comparative catalyst performance testing results reveal that at 78 W % conversion level, the propylene productions are 8.0 W % and 5.3 W % and the light olefin productions are 13 and 21 W %, for the conventional and propylene production FCC conditions respectively.

Example 2

Two set of Advanced Catalyst Evaluation (ACE) tests were conducted using a two-stage hydrocracking unit unconverted bottoms from hydrocracking of Arab light/heavy VGO, the properties of which are shown in Table 4. The first test was conducted with a commercial light olefin producing catalyst USY zeolite based including an additive (25% of the catalyst) for increased light olefin production. The second test was conducted with the Ti—Zr—Y zeolite catalyst (FCC catalyst A). The tests were carried-out at 600° C., (propylene production FCC conditions), using a catalyst to oil ratios in the range of 3:1 to 6:1, and at a residence time of 30 seconds. Both liquid and gas products were collected and analyzed using gas chromatography. Conversion and products yields were calculated on mass basis.

After completion of the ACE tests, the catalyst sample was collected from the testing reactor and the amount of solid coke deposits was measured. Gas products were analyzed for the following components: hydrogen, methane, ethane, propane, propylene, iso- and normal-butane, and butenes. Liquid products analyzed for the following components: gasoline, which has a boiling range from pentane boiling point to a temperature of 216° C., light cycle oil (LCO), which has a boiling point range from 216° C. to 343° C., and heavy cycle oil (HCO), which has a boiling point of 343° C. and higher, denoted as 343+ fraction.

Tables 5 illustrates the conversion and product yields of Ti—Zr inserted USY zeolite compared to commercial light olefin producing catalyst including an additive for increased light olefin production at propylene production conditions with hydrocracker bottoms.

TABLE 4

Properties Hydrocracker Bottoms Oil

| | | |
|---|---|---|
| Density @ 15° C. | g/cm³ | 0.8342 |
| Viscosity @ 50° C. | | 15.1 |
| Viscosity @ 100° C. | | 4.643 |
| CCR | W % | 0.01 |
| Aniline Point | ° C. | 119.8 |
| C | W % | 85.57 |
| H | W % | 14.07 |
| N | W % | <0.01 |
| S | W % | 0.0004 |
| Basic Nitrogen | ppm | 0 |
| Fe | ppm | <1 |
| V | ppm | <1 |
| Ni | ppm | <1 |
| IBP | ° C. | 302 |
| 5 | ° C. | 366 |
| 10 | ° C. | 389 |
| 20 | ° C. | 411 |
| 30 | ° C. | 424 |
| 50 | ° C. | 444 |
| 70 | ° C. | 468 |
| 80 | ° C. | 484 |
| 90 | ° C. | 511 |
| 95 | ° C. | 536 |
| FBP | ° C. | 653 |

TABLE 5

MAT testing results for commercial FCC catalyst and Ti—Zr—USY catalyst (FCC catalyst A) at propylene production FCC conditions

| | Commercial olefin producing catalyst including an additive | | Ti—Zr—Y Zeolite catalyst (FCC catalyst A) | |
|---|---|---|---|---|
| Cracking T, (° C.) | 600 | 600 | 600 | 600 |
| T.O.S.(s) | 60.00 | 60.00 | 60.00 | 60.00 |
| CAT/OIL (wt/wt) | 3.02 | 6.02 | 3.01 | 4.01 |
| CONV.(%) | 69.91 | 78.93 | 81.33 | 82.28 |
| Yields (wt %) | | | | |
| Hydrogen | 0.19 | 0.34 | 0.12 | 0.14 |
| Methane | 0.97 | 1.32 | 1.28 | 1.67 |
| Ethane | 0.81 | 1.06 | 0.90 | 1.17 |
| Ethylene | 4.31 | 6.19 | 2.82 | 2.45 |
| Propane | 2.49 | 4.68 | 2.18 | 2.08 |
| Propylene | 15.79 | 17.73 | 20.71 | 18.51 |
| Isobutane | 2.32 | 3.68 | 5.43 | 5.93 |
| n-Butane | 1.06 | 1.76 | 1.42 | 1.54 |
| 1-Butene | 2.47 | 2.75 | 3.83 | 4.11 |
| Isobutylene | 5.90 | 7.04 | 8.02 | 7.94 |
| c-2-Butene | 2.69 | 3.12 | 4.20 | 4.42 |
| t-2-Butene | 3.70 | 4.30 | 5.80 | 6.13 |
| 1,3 Butadiene | 0.04 | 0.02 | 0.16 | 0.24 |
| Gasoline | 27.86 | 21.36 | 20.89 | 20.96 |

TABLE 5-continued

MAT testing results for commercial FCC catalyst and Ti—Zr—USY catalyst (FCC catalyst A) at propylene production FCC conditions

| | Commercial olefin producing catalyst including an additive | | Ti—Zr—Y Zeolite catalyst (FCC catalyst A) | |
|---|---|---|---|---|
| LCO | 7.86 | 6.83 | 6.74 | 7.77 |
| HCO | 20.01 | 14.53 | 14.15 | 13.19 |
| Coke | 1.53 | 3.27 | 1.38 | 1.75 |

The method and system of the present invention have been described above and in the attached drawings; however, modifications will be apparent to those of ordinary skill in the art and the scope of protection for the invention is to be defined by the claims that follow.

We claim:

1. A method for cracking a hydrocarbon oil comprising contacting the hydrocarbon oil with a catalyst comprising an ultra-stable Y-type zeolite in a fluidized catalytic cracking unit to produce light olefins and gasoline fuel, wherein the ultra-stable Y-type zeolite is a framework-substituted zeolite in which a part of aluminum atoms constituting a zeolite framework thereof is substituted with 0.1-5 mass % zirconium atoms and 0.1-5 mass % titanium ions calculated on an oxide basis.

2. The method according to claim 1, comprising contacting a hydrocarbon oil having a boiling point range above about 350° C. to said catalyst at a reaction temperature ranging from about 450° C. to about 700° C., a pressure of about 1 to about 10 bars, for from about 0.1 to about 60 seconds, at a catalyst to oil ratio of from about 2:1 to about 30:1.

3. The method according to claim 1, wherein the fluidized catalytic cracking unit is a downer reactor.

4. The method according to claim 1, wherein the fluidized catalytic cracking unit is a riser reactor.

5. The method according to claim 1, comprising carrying out said cracking under conditions effective to maximize production of gasoline and light olefins.

6. The method according to claim 1, comprising carrying out said cracking under conditions effective to maximize production of light olefins.

7. The method according to claim 1, wherein said catalyst comprises a mixture of said framework-substituted ultra-stable Y-type zeolite and one or more additional fluidized cracking catalyst materials.

8. The method according to claim 1, wherein the framework-substituted ultra-stable Y-type zeolite has a crystal lattice constant of 2.430 to 2.450 nm, a specific surface area of about 600 to about 900 m²/g, and a molar ratio of $SiO_2$ to $Al_2O_3$ in the range of about 5:1 to about 100:1.

9. The method of claim 1, wherein said catalyst comprises from 20% to 50% by mass of zeolite.

10. The method of claim 1, wherein said catalyst comprises from 15% to 25% by mass of inorganic binder.

11. The method of claim 10, wherein said inorganic binder is silica sol, water glass, or silicic acid liquid.

12. The method of claim 10, wherein said inorganic binder is basic aluminum chloride, aluminum biphosphate, or alumina sol.

13. The method of claim 10, wherein said inorganic binder comprises kaolin, clay, activated alumina, porous silica, a rare earth oxide, or a metal trapping agent.

14. The method of claim 13, wherein said rare earth oxide has formula $RE_2O_3$ and is present at a range of 0 to 3% by mass.

15. The method of claim 14, wherein RE is Ce, La, Pr, or Nd.

16. The method of claim 1, wherein the ultra-stable Y-type zeolite has a molar ratio of $SiO_2$ to $Al_2O_3$ in the range of about 20:1 to 100:1.

17. The method of claim 16, wherein the ultra-stable Y-type zeolite has a molar ratio of $SiO_2$ to $Al_2O_3$ in the range of about 25:1 to 80:1.

* * * * *